No. 624,584. Patented May 9, 1899.
F. WASHINGTON.
COFFEE POT ATTACHMENT.
(Application filed June 24, 1898.)
(No Model.)
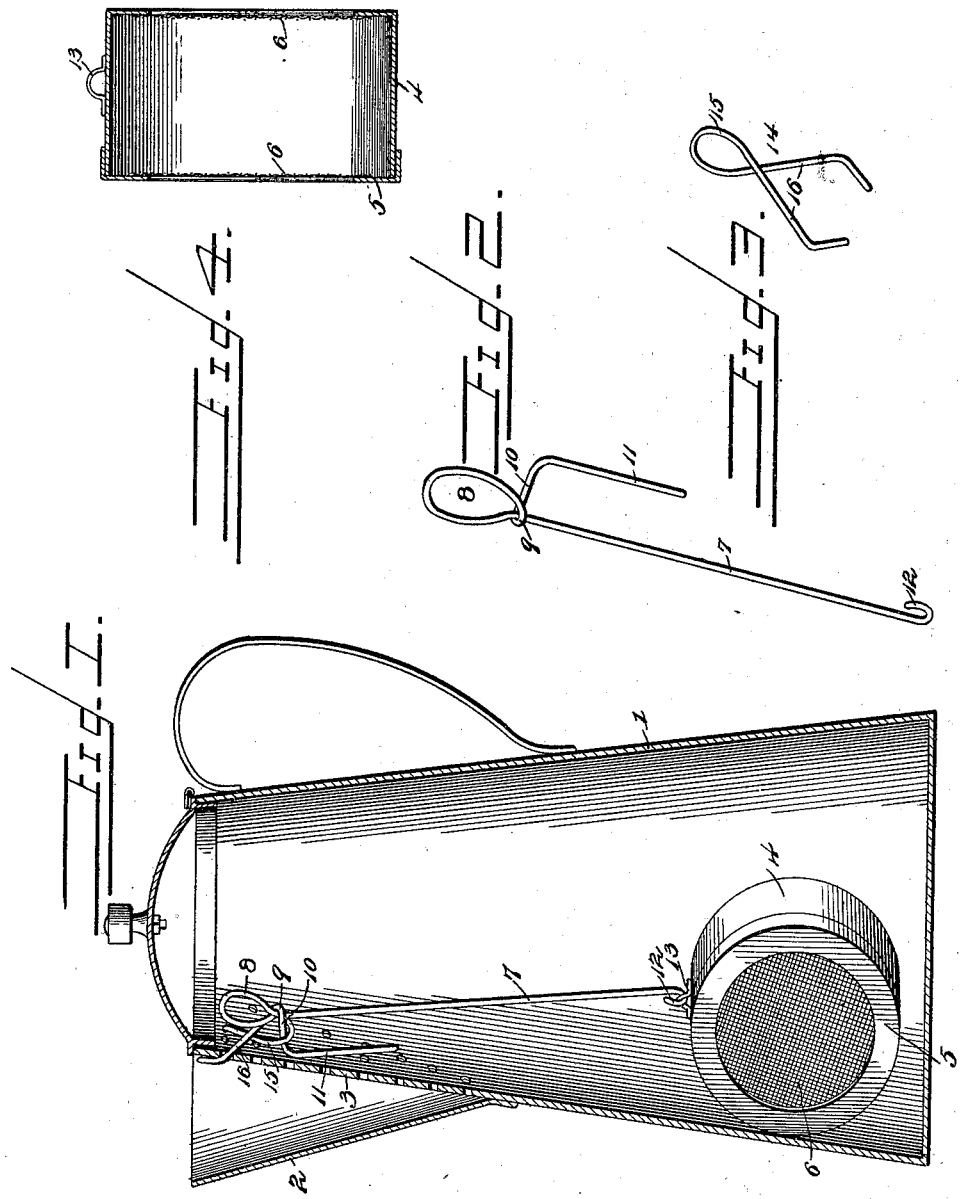
Witnesses  
Fortune Washington, Inventor  
By his Attorneys,

UNITED STATES PATENT OFFICE.

FORTUNE WASHINGTON, OF COLCHESTER, ILLINOIS, ASSIGNOR OF ONE-HALF TO SILAS CUBA AND AMBROSE CUBA, OF TENNESSEE, ILLINOIS.

COFFEE-POT ATTACHMENT.

SPECIFICATION forming part of Letters Patent No. 624,584, dated May 9, 1899.

Application filed June 24, 1898. Serial No. 684,378. (No model.)

*To all whom it may concern:*

Be it known that I, FORTUNE WASHINGTON, a citizen of the United States, residing at Colchester, in the county of McDonough and State of Illinois, have invented a new and useful Coffee-Pot Attachment, of which the following is a specification.

This invention relates to percolators for tea or coffee pots and the like; and the object thereof is to provide certain new and useful improvements in the manner of suspending the device within the common or ordinary form of pot without altering the construction of the same.

Other objects and advantages of my invention will be hereinafter more fully described, shown in the drawings, and particularly pointed out in the claims.

In the drawings, Figure 1 is a vertical sectional view of a tea or coffee pot having my improved percolator suspended therein. Fig. 2 is a detail perspective view of the hanger. Fig. 3 is a detail perspective view of the spring-clip. Fig. 4 is a sectional view of the percolator-body.

Corresponding parts in the several figures are denoted by like characters of reference.

Referring to the drawings, 1 designates the simplest form of tea or coffee pot, having the usual spout 2 and strainer 3, formed by perforating the body of the pot inclosed by the spout, or a strainer of reticulated material may be used.

The percolator itself comprises a cup or body 4, having a removable cover 5, the body and cover each being perforated or provided with reticulated material 6. The percolator thus formed is filled with the coffee or material to be steeped and suspended in the water in the pot, the perforated portions 6 allowing of the water having access to the material which is steeped without leaving any sediment whatever.

To suspend the percolator, I provide a hanger formed from a single piece of wire, comprising a shank 7, which is formed into an eye 8 at its upper end and then coiled about the shank at the base of the eye, as at 9, then bent away from the shank, as at 10, and formed into an offset arm 11, preferably parallel with the shank. The other end of the shank is formed into a hook 12, which is adapted to be caught into an eye or loop 13, provided upon the side of the percolator.

The eye 8 serves to suspend the percolator upon a nail or hook when not in use, and the arm 11 is to suspend the device in its operative position in the pot.

A spring-clip 14, having an eye 15 and spring-fingers 16, is mounted within a pair of the openings of the strainer 3, as shown, and the arm 11 of the hanger is placed in the eye of the clip, with the transverse arm 10 resting in the eye and suspending the percolator within the pot. The spring-clip is preferably formed, as shown, of a single piece of wire bent intermediate its ends and forming the eye 15 and then crossed to form the spring-fingers 16, the extremities of which are converged, as shown. By this formation the ends of the fingers are brought near together and can be easily inserted through a pair of openings in the strainer, and after being placed in position they spread out and the clip assumes an inclined position, being held by frictional contact, as will be readily understood. The clip may be placed in any of the holes of the percolator, and by reason of its downward inclination and the offset arm 11 spacing the hanger away from the side of the pot the device is suspended in such a position as not to interfere with the closing of the cover.

It is preferable to use the spring-clip, as the device is more easily placed in position; but should the clip become broken or lost the offset arm 11 may be bent out and away from the shank and inserted through one of the openings in the strainer, as will be understood, and the device thus suspended in position without the employment of the clip.

Having thus described the invention, what I claim, and desire to secure by Letters Patent, is—

1. A percolator comprising a perforate body or receptacle, and a hanger therefor, the latter formed of a single piece of wire carrying the receptacle at one end, and bent intermediate its ends into a suspending-eye, and the shorter end thereof twisted or coiled about the shank of the hanger and beneath the eye and formed into an offset arm extending toward the receptacle and approximately parallel with the said shank, substantially as shown and described.

2. In a percolator, the combination of a clip adapted to engage the perforations of the strainer of the vessel in which the device is used and provided with an eye, and a hanger carrying a perforate receptacle at one end and formed with a hook or arm at the other end thereof, said hook being adapted to engage with the eye of the clip, whereby the device may be suspended within the vessel, substantially as shown and described.

In testimony that I claim the foregoing as my own I have hereto affixed my signature in the presence of two witnesses.

FORTUNE WASHINGTON.

Witnesses:
   NELLIE CHAMP,
   PHEBE CHAMP.